United States Patent
Renon et al.

(10) Patent No.: US 12,510,003 B2
(45) Date of Patent: Dec. 30, 2025

(54) AUXILIARY ARM FOR A TURBOMACHINE EXHAUST CASING

(71) Applicant: SAFRAN AIRCRAFT ENGINES, Paris (FR)

(72) Inventors: Olivier Renon, Moissy-Cramayel (FR); Soufien Akachkachy, Moissy-Cramayel (FR); Gilles Gérard Lhuillery, Moissy-Cramayel (FR); Lore Marie Ricquemaque, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/715,603

(22) PCT Filed: Dec. 2, 2022

(86) PCT No.: PCT/FR2022/052227
§ 371 (c)(1),
(2) Date: Jun. 3, 2024

(87) PCT Pub. No.: WO2023/099853
PCT Pub. Date: Jun. 8, 2023

(65) Prior Publication Data
US 2025/0043698 A1 Feb. 6, 2025

(30) Foreign Application Priority Data
Dec. 3, 2021 (FR) ........................ 2112942

(51) Int. Cl.
*F01D 25/24* (2006.01)
*F01D 9/06* (2006.01)
(Continued)

(52) U.S. Cl.
CPC .............. *F01D 25/24* (2013.01); *H02G 3/34* (2013.01)

(58) Field of Classification Search
CPC . F01D 9/065; F01D 15/10; F01D 9/06; F01D 25/04; F01D 25/24; F01D 25/12;
(Continued)

(56) References Cited

U.S. PATENT DOCUMENTS 3,272,912 A * 9/1966 Jachimowicz .......... F16L 11/00
138/143
5,284,011 A * 2/1994 Von Benken ........... F01D 9/041
415/119

(Continued)

FOREIGN PATENT DOCUMENTS

| FR | 3 051 854 A1 | 12/2017 |
| FR | 3 053 387 A1 | 1/2018 |
| FR | 3 093 130 A1 | 8/2020 |

OTHER PUBLICATIONS

French Search Report dated Jul. 29, 2022 in Application No. 2112942.
(Continued)

*Primary Examiner* — Eric J Zamora Alvarez
(74) *Attorney, Agent, or Firm* — Sughrue Mion, PLLC

(57) ABSTRACT

A casing for a turbomachine includes an internal hub, an external flange coaxial with the internal hub, arms extending radially from the internal hub to the external flange, each arm having a wall, two or more wire harnesses that connect a first electrical apparatus, which is arranged radially outside the external flange, and a second electrical apparatus, which is arranged radially inside the internal hub, a sheath extending within an arm at a distance from the wall of the arm, the sheath including an internal face defining an internal cavity that receives the two or more wire harnesses, and one or more shims mounted in the sheath and holding the wire harnesses at a distance from an internal face of the sheath and holding the wire harnesses at a distance from one another within the sheath.

14 Claims, 5 Drawing Sheets

(51) Int. Cl.
*F01D 25/12* (2006.01)
*H02G 3/04* (2006.01)
*H02G 3/34* (2006.01)

(58) Field of Classification Search
CPC ... F01D 5/00; F01D 9/02; F01D 25/06; F05D 2260/30; F05D 2220/32; F05D 2230/60; F05D 2240/12; F05D 2220/76; F05D 2230/51; B64D 2221/00; H02G 3/34; H02G 3/0481
See application file for complete search history.

(56) References Cited

U.S. PATENT DOCUMENTS

| | | | | |
|---|---|---|---|---|
| 5,598,696 | A * | 2/1997 | Stotts | F23R 3/283 60/800 |
| 6,038,862 | A * | 3/2000 | Melman | F23D 14/46 60/725 |
| 9,314,844 | B2 * | 4/2016 | Geiger | B33Y 80/00 |
| 9,847,629 | B2 * | 12/2017 | Moisei | B22F 5/106 |
| 10,071,811 | B2 * | 9/2018 | Kupiszewski | F04D 25/06 |
| 10,308,366 | B2 * | 6/2019 | Kupiszewski | F02K 5/00 |
| 10,329,935 | B2 * | 6/2019 | Gaudry | F01D 9/065 |
| 10,557,572 | B2 * | 2/2020 | Banhos | F01D 25/04 |
| 10,774,954 | B2 * | 9/2020 | Batista | F01D 9/06 |
| 10,871,077 | B2 * | 12/2020 | Stoliaroff-Pepin | F01D 9/042 |
| 10,934,890 | B2 * | 3/2021 | Ott | B22F 5/10 |
| 11,136,894 | B2 * | 10/2021 | Sultana | F01D 9/065 |
| 11,852,024 | B2 * | 12/2023 | Hanczewski | F01D 9/02 |

OTHER PUBLICATIONS

International Search Report dated Mar. 29, 2023 in French Application No. PCT/FR2022/052227.

* cited by examiner

AUXILIARY ARM FOR A TURBOMACHINE EXHAUST CASING

CROSS REFERENCE TO RELATED APPLICATIONS

This application is a National Stage of International Application No. PCT FR2022/052227 filed on Dec. 2, 2022, claiming priority based on French Patent Application No. 2112942 filed on Dec. 3, 2021, the contents of each of which being herein incorporated by reference in their entireties.

TECHNICAL FIELD

The present invention relates to turbomachines, particularly aeronautical turbine engines, and more particularly to an aircraft turbomachine exhaust casing.

The invention relates more particularly but not exclusively to an exhaust casing intended to be used in an engine of the USF type (acronym of "Unducted Single Fan" for a single non-ducted fan), comprising a movable blading and a fixed aircraft engine unducted fan blading.

BACKGROUND

A turbomachine has a longitudinal axis around which it extends and typically includes, from upstream to downstream in the direction of flow of the gases, a fan, a low-pressure compressor, a high-pressure compressor, a combustion chamber, a high-pressure turbine, and a low-pressure turbine comprising in particular an exhaust casing. The exhaust casing contributes to defining the primary stream of the fluid (or primary stream of the gases) passing through the turbomachine and ensures, by means of the bearing support, the concentricity between the rotor and the stator of the turbomachine, as well as the attachment of the downstream side of the engine to the nacelle.

This exhaust casing typically comprises a hub, centered on the axis of the turbomachine, an external flange coaxial with the hub, and a set of arms connecting the hub and the external flange. The arms are located in the primary flow and are consequently hotter than the external flange and the hub. The arms of the exhaust casing are therefore subjected to large thermal gradients which generate mechanical stresses in the arms, having an impact on the lifetime of the exhaust casing.

A turbomachine can comprise other similar casings, such as an intermediate casing (interspersed between a low-pressure compressor and a high-pressure compressor of the turbomachine, and therefore has a gas flow leaving the low-pressure compressor and intended to feed the high-pressure compressor flowing through it) or an inter-turbine casing (interspersed between the high-pressure turbine and the low-pressure turbine).

The operation of a conventional turbomachine involves in particular the passage of electrical cables and the circulation of various fluids through the turbomachine, such as air, oil, or oily air. In order to route these fluids, it is known to arrange channels in the very structure of the turbomachine. Certain of these channels, called auxiliary tubes, must connect radially external portions of the turbomachine to radially internal portions, and thus pass through the primary and secondary air flows.

It is known to have auxiliary elements such as auxiliary tubes pass within hollow casing arms, such as the hollow arms of the exhaust casing, without perturbing the flux of the flow inside the stream due to their internal cavity. Generally, each of the auxiliary elements allows connecting at least one first apparatus located radially inside the stream to at least one second apparatus located radially outside the stream of the casing.

Within the framework of the development of the USF, numerous power wire harnesses must pass into the exhaust casing for electrical hybridization requirements and the integration of speed sensors at the low-pressure turbine shaft. However, current technologies do not allow resisting the usual temperatures undergone by the exhaust casing arms in a turbomachine of this type. It is therefore appropriate to cool the harnesses by circulating air around the latter in a limited space. But existing solutions do not allow cooling the harness within a small footprint, while taking into account the thermal dilations induced by the flow passing through the exhaust casing and the risk of vibrations of the wire harnesses.

SUMMARY

One object of the disclosure is to correct the aforementioned disadvantages by proposing a solution allowing passing the wire harnesses in a simple, ergonomic and space-saving manner through an arm of an exhaust casing, while taking into account the severe thermal environment to which the arms are subjected and also resisting the vibrations generated by the engine.

To this end, an exhaust casing is proposed, according to a first aspect, comprising:
- an internal hub extending around an axis;
- an external flange coaxial with the internal hub;
- a plurality of arms extending from the internal hub to the external flange, each arm having a wall;
- wire harnesses configured to connect a first electrical apparatus arranged radially outside the external flange and a second electrical apparatus arranged radially inside the internal hub; and
- a sheath extending within an arm at a distance from the wall of the arm, the sheath comprising an internal face defining an internal cavity configured to receive the wire harnesses; and
- at least one shim mounted in the sheath, each shim being configured to hold the wire harnesses at a distance from an internal face of the sheath.

Certain preferred but non-limiting features of the casing according to the first aspect are the following, taken individually or in combination:
- the sheath houses at least two wire harnesses, the shim also being configured to hold the at least two wire harnesses at a distance from one another within the sheath;
- the shim comprises at least two through passages, each wire harness being housed in a corresponding through passage;
- the casing also comprises a ventilation system in fluid communication with the internal cavity of the sheath;
- the casing also comprises the second electrical apparatus arranged radially inside the internal hub, the sheath also extending between the internal hub and the second electrical apparatus so that the ventilation system is in fluid communication with the second electrical apparatus;
- the shim also comprises at least one indentation configured to allow circulation of fluid between the external flange and the internal hub in order to place the second electrical apparatus in fluid communication with the ventilation system;

the casing also comprises a thermal insulator attached to an external face of the sheath;

the sheath is mounted movably relative to at least one of the external flange and the internal hub by allowing radial travel of the sheath relative to the external flange and/or relative to the internal hub;

the shim has support zones configured to come into contact with the internal face of the sheath in order to hold the wire harnesses at a distance from the internal face of the sheath, the support zones being able to be curved or flat; and/or the casing comprises at least two wire harnesses and at least two sheath portions forming a sheath which extends within the arm, the at least two sheath portions being arranged end-to-end along the wire harnesses so as to form a sheath which surrounds the wire harnesses.

According to a second aspect, the invention proposes a turbomachine comprising a According to a second aspect, the disclosure proposes a turbomachine comprising a casing conforming to the first aspect. In one embodiment, the casing being located in a primary stream of the turbomachine. The turbomachine can also comprise a single, inducted fan. If appropriate, the turbomachine can be of the USF type or comprise a ducted fan.

According to a third aspect, the disclosure proposes an aircraft comprising a turbomachine including a casing conforming to the first aspect. The turbomachine can also conform to the second aspect.

DESCRIPTION OF THE FIGURES

Other features, objects and advantages will be revealed by the description that follows, which is purely illustrative and not limiting, and which must be read with reference to the appended drawings in which.

In all the figures, similar elements bear identical labels.

DETAILED DESCRIPTION OF THE INVENTION

As described above, a turbomachine 1 of an aircraft 100 typically includes, from upstream to downstream in the direction of flow of the gases, a fan 2, a low-pressure compressor, a high-pressure compressor, a combustion chamber, a high-pressure turbine, a low-pressure turbine and an exhaust casing 8 extending overall around a longitudinal axis X and located in a primary stream of the turbomachine 1. One example of a turbomachine 1 that can include an exhaust casing conforming to the present disclosure is an engine of the USF type. The disclosure is not, however, limited to this type of engine and finds application in any turbomachine comprising an exhaust casing.

Figure 1:
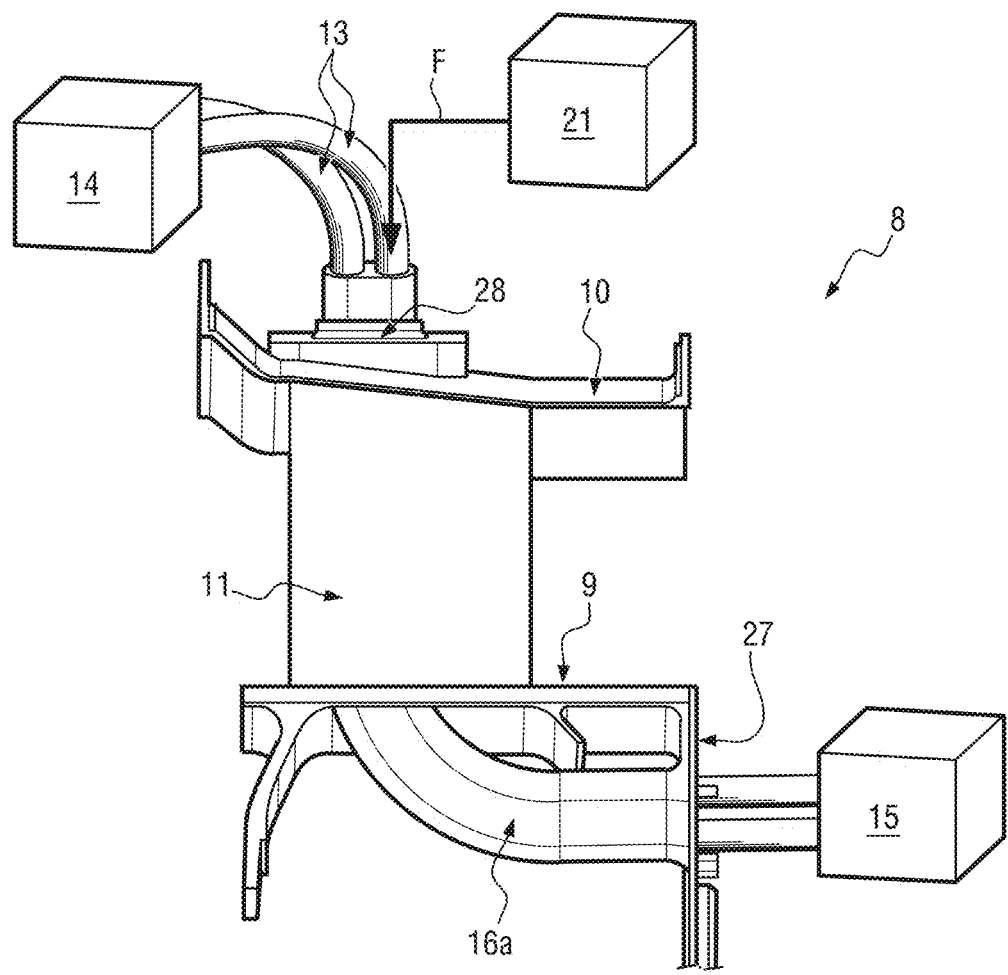
FIG. 1 is a partial view of an exhaust casing conforming to one embodiment of the invention.
Figure 2:
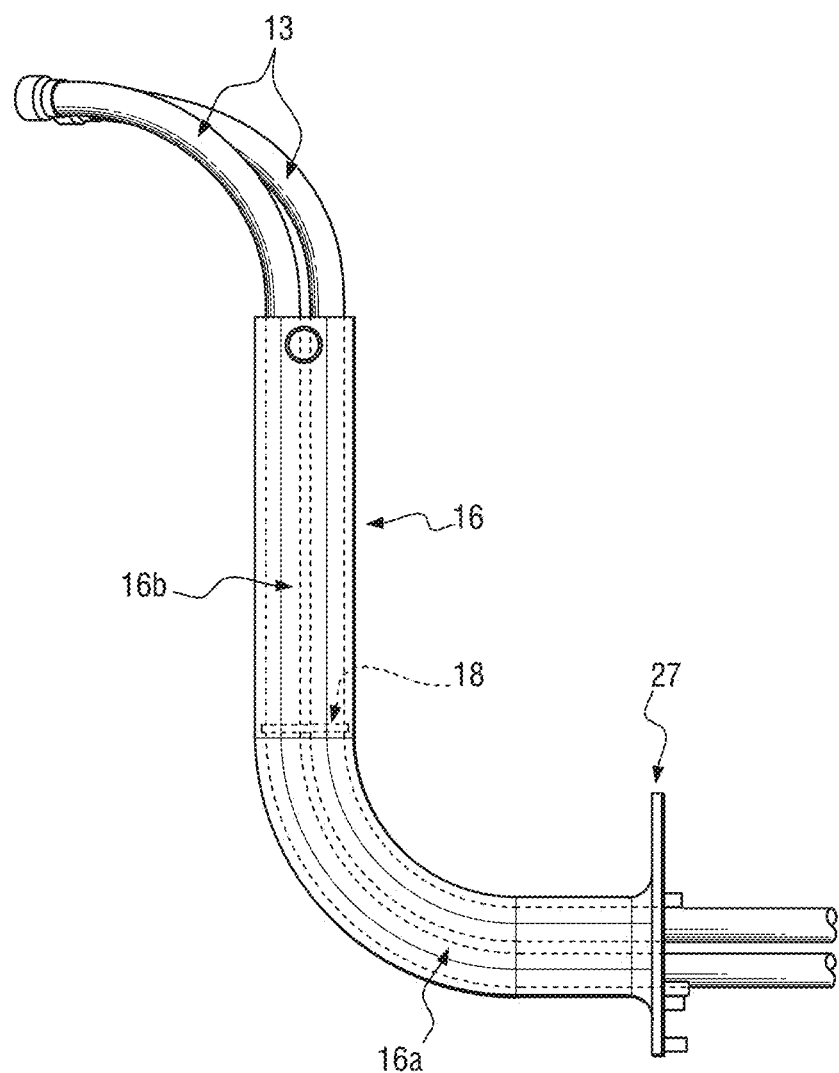
FIG. 2 shows the sheath and the harnesses of FIG. 1.
Figure 3A:
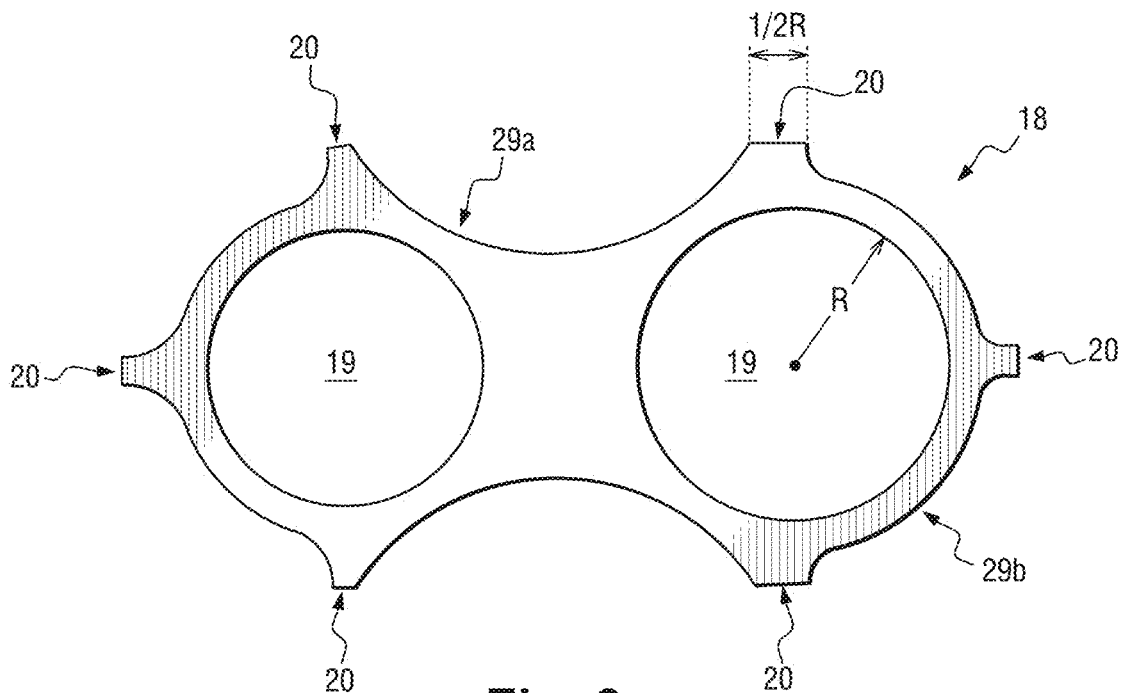
FIG. 3a is a top view of a first exemplary embodiment of a shim which can be used in a casing conforming to the disclosure.
Figure 3B:
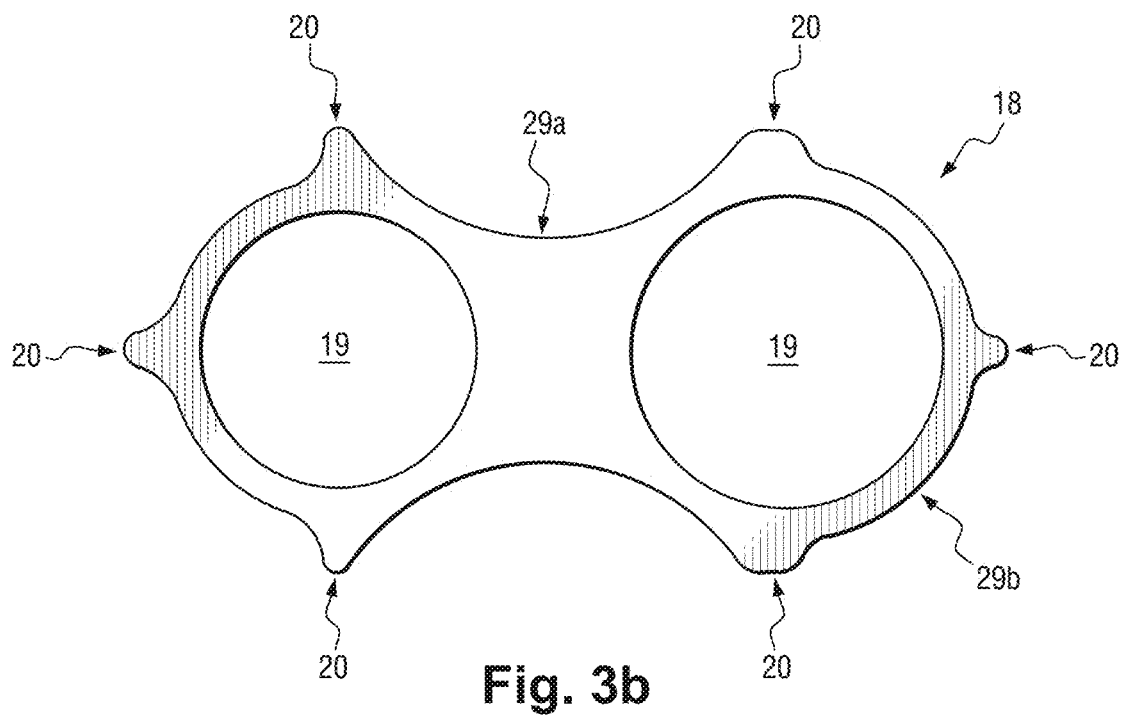
FIG. 3b is a top view of a second exemplary embodiment of a shim which can be used in a casing conforming to the disclosure.
Figure 4:
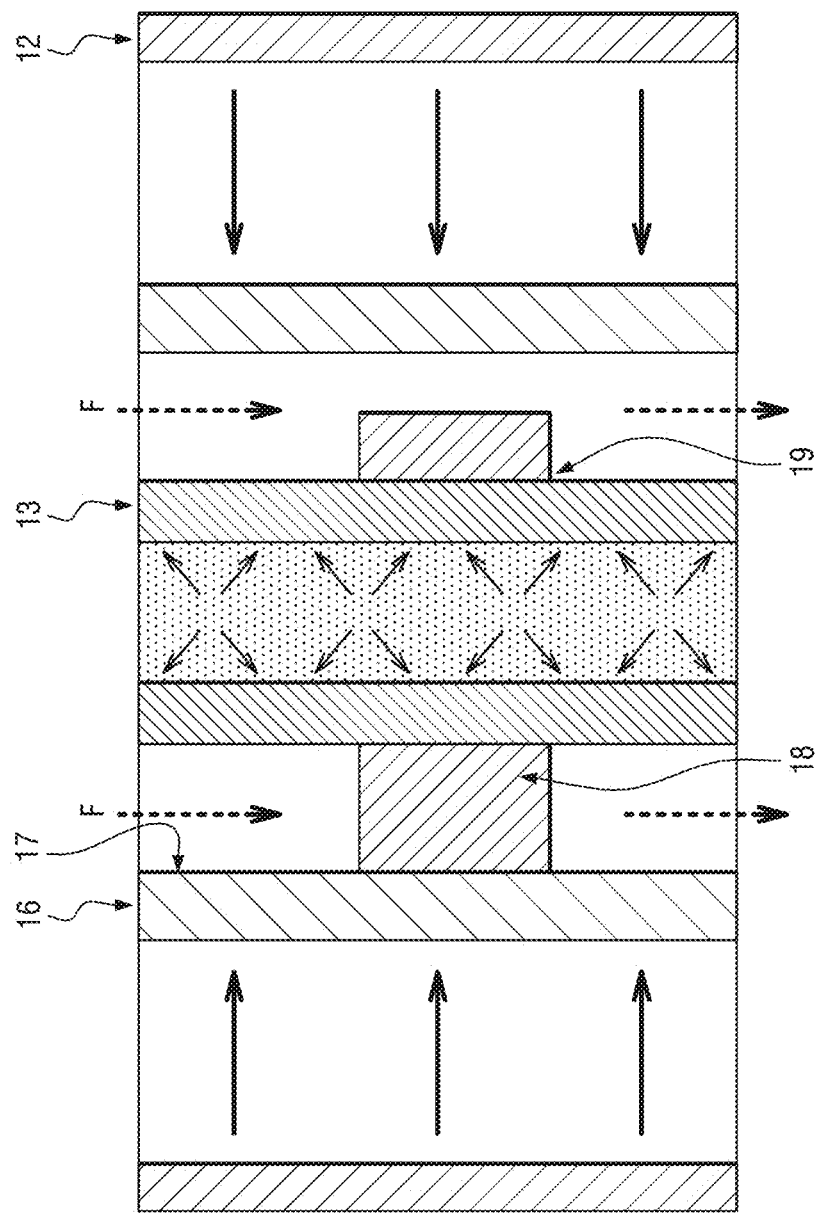
FIG. 4 is a partial section view taken in a plane comprising the X axis and a radial axis passing through the arm of the casing of FIG. 1.
Figure 5:
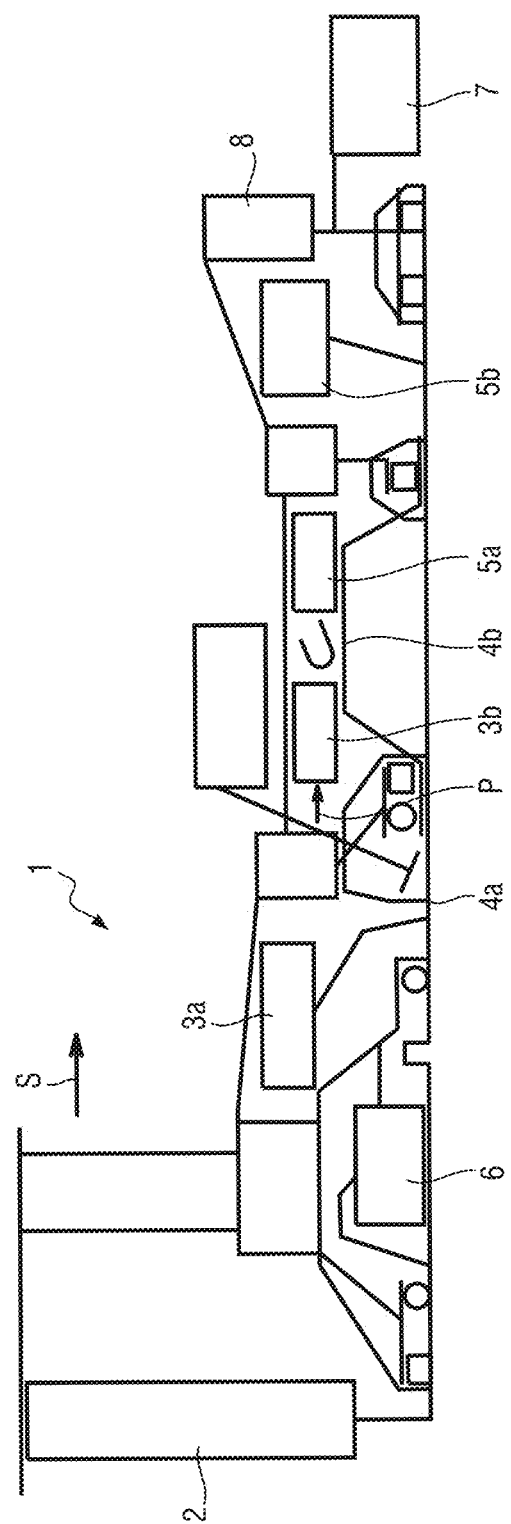
FIG. 5 is a schematic view of an example of a turbomachine which can comprise an exhaust casing conforming to one embodiment.

Thus, an example of a hybrid aircraft turbomachine 1 is shown in FIG. 1, which can comprise an exhaust casing conforming to one embodiment. Like known turbomachines of the prior art, the turbomachine 1 is a double flow turbomachine which includes, from upstream to downstream, a fan 2, a low-pressure compressor 3a also called a booster, a high-pressure compressor 3b, a combustion chamber, a high-pressure turbine 5a, and a low-pressure turbine 5b. An exhaust casing 8 is arranged downstream of the low-pressure turbine 5b. At the downstream end of this exhaust casing and coaxial with it is attached a nozzle cone, which is an aerodynamic element also called a plug and which allows guiding the exhaust gases at the outlet of the turbomachine 1. The low-pressure 3a and high-pressure 3b compressors, the combustion chamber, the high-pressure turbine 5a, and the low-pressure turbine 5b define a gas stream which a primary flow P passes through. Around these elements, the turbomachine 1 also has a secondary flux S passing through it which is driven by the fan 2. The primary P and secondary S flows join at the outlet of the turbomachine 1. The high-pressure compressor 3b and the high-pressure turbine 5a are connected by a high-pressure shaft 4b and form a high-pressure body. The low-pressure shaft 4a drives the fan 2 by means of a reduction gear 6 which is arranged substantially in a front casing of the turbomachine 1, also called an inlet casing, at right angles to the outlet fixed guide vanes which straighten the secondary flow S downstream of the fan 2. The turbomachine 1 includes several casings namely, as already seen, the front casing or inlet casing which supports the outlet fixed guide vanes and the exhaust casing 8. It also includes an intermediate casing arranged axially between the low-pressure compressor 3a and the combustion chamber 3b, and a turbine casing arranged axially between the high-pressure turbine 5a and the low-pressure turbine 5b. A turbomachine 1 configuration of this type is known under the acronym UHBR ID (Ultra-High Bypass Ratio, Integral Drive), which relates to double flow engine configurations including a high-pressure body and a low-pressure body which drives, for its part, a ducted fan with a high bypass ratio.

In one embodiment, the turbomachine 1 is a hybrid turbomachine, i.e. it includes an electrical machine 7 which is coupled to the low-pressure shaft. The hybrid turbomachine 1 architecture includes more particularly an electrical machine 7 (which can comprise an electric generator or an electric motor) which is arranged downstream of the low-pressure turbine 5b and of the exhaust casing 8, coaxially with it along the main axis X, and which is housed in the plug inside a nozzle of the turbomachine 1. For its electrical power supply, it is necessary that at least one power transmitting conducting element (wire harness) pass through the stream, this in order to allow providing the electrical connection of the electrical machine 7 with at least one member outside the stream, and particularly with the turbomachine 1. The disclosure allows providing the pathway of this power transmitting conducting element by advantageously using the exhaust casing 8.

In the present application, upstream and downstream are defined relative to the normal direction of flow of the gas in the turbomachine 1, and more particularly within the casing 8 frame of reference. The axial direction corresponds to the direction of the axis X and a radial direction is a direction perpendicular to this axis X and passing through it. Unless otherwise stated, internal (respectively, inner) and external (respectively, outer), respectively are used with reference to a radial direction so that the internal portion or face of an element is closer to the axis X than the external portion or face of the same element.

The exhaust casing 8 comprises an internal hub 9 coaxial with the longitudinal axis X, an external flange 10 coaxial with the internal hub 9 and extending around the internal hub 9, a set of arms 11 mechanically connecting the internal hub 9 and the external flange 10.

The arms 11 are regularly distributed circumferentially around the internal hub 9. In one embodiment, the arms 11 extend substantially between the internal hub 9 and the external flange 10 of the casing 8. The arms 11 can in particular be slightly inclined (by approximately) 15° in the circumferential direction.

Each arm 11 comprises a wall 12 which defines an internal space extending radially from the internal hub 9 to the flange 10, over the entire length of the corresponding arm 11. The arms 11 are therefore hollow.

The casing 8 also comprises control or power wire harnesses 13 configured to connect electrical apparatus 14 (typically a controller and an electric generator) arranged radially outside the external flange 10, with electrical apparatus 15 (typically, an electrical machine such as the machine 7) arranged radially inside the internal hub 9, and one or more sheaths 16 extending within an arm 11 at a distance from the wall 12 of the arm 11. The sheath(s) 16 is/are connected to the internal hub 9 and to the external flange 10 by means of mechanical connections. Each sheath 16 comprises an internal face 17 defining an internal cavity configured to receive one or more wire harnesses 13. It will be noted that only one of the arms 11 of the casing 8 can comprise a sheath 16 of this type. As a variant, more arms or each arm 11 of the casing 8 can comprise a sheath 16.

In order to protect the wire harnesses 13 from the thermal and vibrational environment of the casing 8 in a small footprint, the casing 8 also comprises a shim 18 mounted in each sheath 16. The shim 18 is configured to hold the wire harnesses 13 at a distance from an internal face 17 of the corresponding sheath 16. To this end, the shim 18 can comprise a passage 19 through the wire harness 13. In particular, each through passage 19 is configured to receive a corresponding wire harness 13. Preferably, the dimension of the through passage 19 is adjusted depending on the diameter of the corresponding wire harness 13 so that the shim 18 can hold the wire harness 13 with clamping (with no clearance). As a variant, the shim 18 can be mounted so as to provide sliding centering in the sheath 16.

The shim 18 thus allows avoiding contact between the wire harnesses 13 and the sheath 16 in order to limit the wear of the wire harnesses 13 by maintaining a constant air gap between the wire harnesses 13 and the sheath 16. The shim 18 also allows avoiding thermal conduction between the sheath 16 (which is housed in an arm 11 placed in a hot gas flow, at the turbine outlet), and the wire harnesses 13, which themselves generate calories (particularly when they are under heavy electrical load). The shim 18 also allows controlling the dynamic modes of the wire harnesses 13.

In a first embodiment, the casing 8 comprises at least two wire harnesses 13 (three for example) which are housed in the same sheath 16. A shim 18 is then mounted in the sheath 16 so as to hold each wire harness 13 at a distance from the internal face 17 of the sheath 16. The shim 18 is also configured to maintain an air gap between the wire harnesses 13 housed in this sheath 16 in order to guarantee the thermal and/or electrical specifications of the harnesses.

To this end, in one embodiment, each shim 18 comprises as many through passage 19 as there are wire harnesses 13, each through passage 19 being configured to receive a corresponding wire harness 12 and have it pass through. The through passages 19 are preferably non-communicating, and in every case configured so that the shim 18 provides physical separation between the wire harnesses 13 within the sheath 16. For example, when the sheath 16 houses exactly two wire harnesses 13, the shim 18 can comprise two separate through passages 19.

The through passages 19 can for example be circular or ovoid.

In a second embodiment, the casing 8 comprises two wire harness 13 (or more), each housed in a corresponding sheath 16 portion within the internal cavity of the arm 11. The sheath 16 housed in the arm 11 then comprises as many sheath portions as wire harnesses 13 to be allowed to pass along the arm 11 between the external flange 10 and the internal hub 9. Each wire harness 13 thus passes through a corresponding sheath portion 16. A shim 18 is then mounted in each sheath portion 16 so as to hold the corresponding wire harness 13 at a distance from the internal face 17 of the corresponding sheath portion 16. The portions of the sheath 16 are also attached rigidly together in order to ensure their mechanical retention and to limit their deformations under load, for example by gluing or by means of a mechanical separator. The through passage 19 can for example be circular or ovoid.

In this embodiment, each portion of the sheath forms a closed envelope around the wire harness(es) that it receives. The portions of the sheath 16 are moreover arranged end-to-end along the wire harnesses 13 so as to form the sheath 16 together.

The first and the second embodiment can of course be combined. Thus, the arm 11 can comprise several sheaths 16, each sheath 16 housing at least one wire harness 13 and one shim separating the corresponding electrical harness 13 from the internal face 17 of the sheath 16 and, if necessary, from another wire harness 13 housed in the same sheath 16. The sheaths 16 are also attached rigidly together has described above.

Each shim 18 can be mounted on the wire harness(es) 13 and/or on the internal face 17 of the corresponding sheath 16.

In a first embodiment, the shim 18 is integrated directly with the external layers of the wire harnesses 13 that it receives and is monolithic with these wire harnesses 13. As a variant, the shim 18 can be applied and attached, for example by gluing, to the wire harnesses 13.

In a second embodiment, the shim 18 is attached to the internal face 17 of the sheath 16, by gluing for example.

The shim 18 can be movable in translation relative to the wire harnesses 15 or to the sheath 16 in order to take into account in particular the thermal dilations of the sheath 16 and/or the arm 11. In this case, the shim 18 is attached only to the wire harnesses 13 or to the sheath 16. As a variant, the shim 18 can be attached both to the harness and the sheath 16.

If necessary, each sheath 16 can comprise several shims 18 distributed along the sheath 16 between the external flange 10 and the internal hub 9.

The sheath 16 can have any suitable shape. Preferably, the sheath 16 has any suitable cylindrical shape (oval, oblong, rhomboid, etc.). For example, the sheath 16 is a circular cylinder. It can be hydroformed and/or machine welded. The sheath 16 can be produced in any appropriate material, for example stainless steel or even ceramic matrix composite material.

The shim 18 can be produced in the same material as the sheath 16.

Each sheath 16 is also thermally insulated in order to protect the wire harnesses 13 from the high temperatures undergone by the arm 11 of the casing 8. To this end, the sheath 16 can be conventionally insulated by using thermal insulators usually used for oil auxiliaries in exhaust housings 8. Thermal insulators can for example comprise glass wool or silica and be attached to half-shells mounted on the external face of the sheath 16 or fitted in the manner of a sock to the external face of the sheath 16.

The shim 18 comprises support zones 20 configured to come into contact with the internal face 17 of the sheath 16 and provide the air gap between the wire harnesses 13 and the sheath 16. In particular, the shim 18 can comprise a plurality of discrete support zones 20 distributed over its circumference. The support zones 20 are separated two by two by indentations allowing reducing the mass of the rings and, as will be seen hereafter, ensuring the circulation of a cooling fluid between the shim 18 and the sheath 16.

For example, the shim 18 can comprise four support zones 20 distributed equidistantly along its circumference. When the shim 18 receives several wire harnesses 13, the shim 18 comprises at least two times as many support zones 20 as it houses wire harnesses 13, preferably three times as many support zones 20. Thus, when the shim 18 comprises two through passages 19 each receiving a corresponding wire harness 13, it comprises at least six support zones facing one another two by two in order to ensure a balanced distribution of contacts.

When the shim 18 is attached to the wire harnesses 13 and in order to limit friction between the shim 18 and the sheath 16, the support zones 20 can be substantially planar and formed so as to have a length at most equal to half the radius R of the through passage 19 formed in the shim 18. As a variant, the support zones 20 can be curved.

The casing 8 also comprises a ventilation system 21 configured to cool the wire harnesses 13 in order to remove the calories generated by the wire harnesses 13 when they are under heavy load and to protect the wire harnesses 13 from the high temperatures that can be reached during operation within the casing 8. The ventilation system 21 can in particular be arranged radially outside the external flange 10 and be connected fluidly to the sheath 16 by means of suitable sleeves.

In one embodiment, the cooling fluid F (air) circulating in the sheath 16 is also used to cool an electrical apparatus 15 arranged radially inside the internal hub 9, for example an electrical machine housed in an enclosure within the internal hub 9. For this purpose, the sheath 16 is mechanically connected to the enclosure in order to put the cavity defined by the enclosure and housing the electrical apparatus 15 in fluid communication with the ventilation system 21. The sheath 16 can, for example, comprise a portion 16a extending within the internal hub 9 which is mechanically connected to the enclosure. The sheath 16 then extends within the arm 11, from the external flange 10 to the internal hub 9, as well as within the internal hub 9. The portion 16b housed in the arm 11 can be substantially rectilinear. The portion 16a of the sheath 16 housed in the internal hub 9 can be curved depending on the position of the enclosure in order to connect the sheath 16 to the enclosure. In one embodiment, the radially internal end of the sheath 16 can comprise a plate 27 in order to allow its mechanical connection to the enclosure by suitable attachment members, bolts for example. If necessary, the enclosure and/or the plate 17 can comprise a series of oblong holes configured to receive the bolts in order to take into account the geometric tolerances of the arm 11 (greater than a millimeter).

The sheath 16 can be mounted on the external flange 10 by means of a slide link 28 so as to allow radial travel of the sheath 16 relative to the external flange 10. In this manner, the sheath 16 is able to slide radially relative to the arm 11 in order to take into account the differential thermal dilations between the sheath 16, which is relatively cold (because it contains the wire harnesses 13 and the cooling ventilation of the harnesses and if necessary of the electrical apparatus), and the casing 8 which is heated by the primary stream at the turbine outlet. The slide link 28 can for example comprise an intermediate part which is attached to a boss belonging to the external flange 10 of the casing 8, at the arm 11 outlet.

The sheath 16 can also be mounted on the internal hub 9 by means of a slide link 28 so as to allow radial travel of the sheath 16 relative to the internal hub 9. This radial sliding in the internal portion of the sheath 16 allows in particular regulating and maintaining in operation the clearance between the sheath 16 and the arm 11, and avoiding all contact between the sheath 16 and the arm 11, but also limiting the dynamic modes of the sheath 16.

Moreover, as previously indicated, the shim 18 comprises one or more indentations 29a, 29b allowing passage of the cooling fluid F sent by the ventilation system 21 between the shim 18 and the sheath 16. Preferably, the shim 18 comprises one indentation 29a, 29b between each support zone.

In the exemplary embodiment illustrated in the figures, the shim 18 is substantially planar and comprises two lobes connected by a central saddle, each lobe comprising a circular through passage 29. The external edges of each lobe are substantially circular and coaxial with the corresponding through passage 29. Here the shim 18 is symmetrical relative to a plane passing through the central saddle. This however is not limiting, the wire harnesses 13 received by the shim 18 being able to have different dimensions, so that the diameters of the through passages 19 could be different within the shim 18.

The shim 18 comprises six support zones 20, including three support zones 20 equally distributed around each lobe and formed for example by protuberances protruding into the plane from the external edge of the lobes. Of course, the shim 18 could include a greater number of support zones 20. In this example, two of the support zones 20 of the shim 18 are placed at the most distant ends of the shim 18, the other four support zones 20 being placed two by two at approximately 90° from the most distant support zones 20. Two concave indentations 29a are formed in the shim 18 between the two pairs of support zones 20 which surround the central saddle, and four convex indentations 29b (defined by the external circular edges of the lobes) are formed in the shim 18 between the pairs of support zones 20 which surround the lobes. It will be understood that the shape of the indentations 29a, 29b is not, however, limiting, the shim 18 possibly comprising only concave indentations 29a or only convex indentations 29b for example.

The invention claimed is:

1. A casing for a turbomachine comprising:
   an internal hub;
   an external flange coaxial with the internal hub;
   a plurality of arms extending radially from the internal hub to the external flange, each arm having a wall;
   at least two wire harnesses configured to connect a first electrical apparatus, which is arranged radially outside the external flange and a second electrical apparatus, which is arranged radially inside the internal hub;

a sheath extending within an arm of the plurality of arms at a distance from the wall of the arm, the sheath comprising an internal face defining an internal cavity configured to receive the at least two wire harnesses; and at least one shim mounted in the sheath, the at least one shim being configured to hold the at least two wire harnesses at a distance from the internal face of the sheath and to hold the at least two wire harnesses at a distance from one another within the sheath.

2. The casing according to claim 1, wherein the at least one shim comprises at least two through passages, each wire harness being housed in a corresponding through passage.

3. The casing according to claim 1, further comprising a ventilated path in fluid communication with the internal cavity of the sheath.

4. The casing according to claim 3, wherein the sheath also extends between the internal hub and the second electrical apparatus, which is arranged radially inside the internal hub, so that the ventilated path is in fluid communication with the second electrical apparatus.

5. The casing according to claim 4, wherein the at least one shim also comprises at least one indentation configured to allow circulation of fluid between the external flange and the internal hub in order to place the second electrical apparatus in fluid communication with the ventilated path.

6. The casing according to claim 1, further comprising a thermal insulator attached to an external face of the sheath.

7. The casing according to claim 1, wherein the sheath is movably mounted relative to at least one of the external flange and the internal hub so as to allow radial travel of the sheath relative to the external flange and/or relative to the internal hub.

8. The casing according to claim 1, wherein the at least one shim has support zones configured to come into contact with the internal face of the sheath in order to hold the at least two wire harnesses at a distance from the internal face of the sheath.

9. The casing according to claim 8, wherein the support zones are curved or flat.

10. The casing according to claim 1, wherein the sheath comprises at least two sheath portions arranged end-to-end along the at least two wire harnesses so as to surround the at least two wire harnesses.

11. A turbomachine comprising the casing according to claim 1, the casing being located in a primary stream of the turbomachine.

12. The casing according to claim 1, wherein the casing is an exhaust casing.

13. A turbomachine comprising:
a first electrical apparatus;
a second electrical apparatus; and
a casing located in a primary stream of the turbomachine, the casing comprising:
an internal hub;
an external flange coaxial with the internal hub;
a plurality of arms extending radially from the internal hub to the external flange, each arm having a wall;
at least two wire harnesses configured to connect to the first electrical apparatus and the second electrical apparatus;
a sheath extending within an arm of the plurality of arms at a distance from the wall of the arm, the sheath comprising an internal face defining an internal cavity configured to receive the at least two wire harnesses; and
at least one shim mounted in the sheath, the at least one shim being configured to hold the at least two wire harnesses at a distance from the internal face of the sheath and to hold the at least two wire harnesses at a distance from one another within the sheath,
wherein the first electrical apparatus is arranged radially outside the external flange, and the second electrical apparatus, is arranged radially inside the internal hub.

14. A casing for a turbomachine comprising:
an internal hub;
an external flange coaxial with the internal hub;
a plurality of arms extending radially from the internal hub to the external flange, each arm having a wall;
at least two wire harnesses configured to connect a first electrical apparatus, which is arranged radially outside the external flange and a second electrical apparatus, which is arranged radially inside the internal hub;
a sheath extending within an arm of the plurality of arms at a distance from the wall of the arm, the sheath comprising an internal face defining an internal cavity configured to receive the at least two wire harnesses, wherein the sheath also extends between the internal hub and the second electrical apparatus;
at least one shim mounted in the sheath, the at least one shim being configured to hold the at least two wire harnesses at a distance from the internal face of the sheath and to hold the at least two wire harnesses at a distance from one another within the sheath, and
a ventilated path in fluid communication with the internal cavity of the sheath and with the second electrical apparatus.

* * * * *